March 26, 1935.  C. C. GLADSON  1,996,014
PROCESS OF MAKING TAP BUSHINGS
Filed June 30, 1933   2 Sheets-Sheet 1
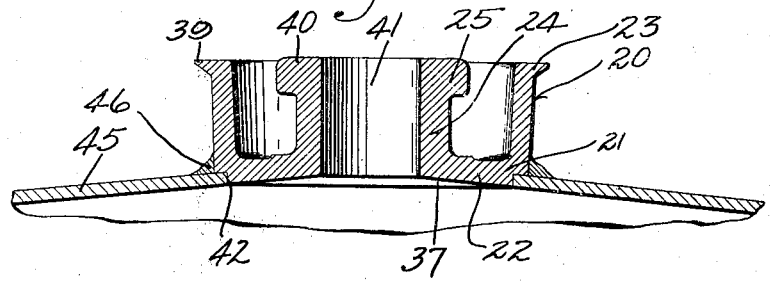
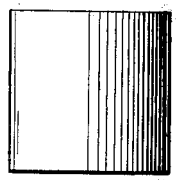
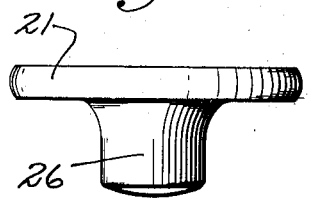
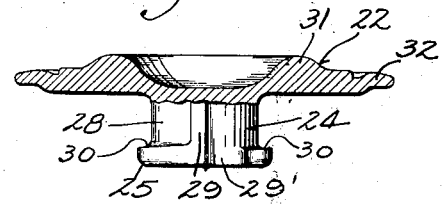
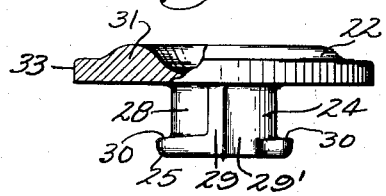
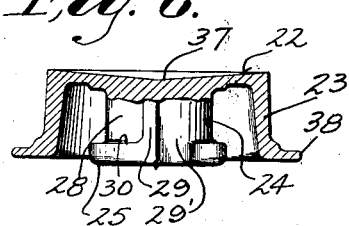
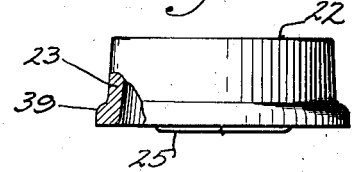
INVENTOR
Clifford C. Gladson
BY Wheeler, Wheeler and Wheeler
ATTORNEYS March 26, 1935.  C. C. GLADSON  1,996,014
PROCESS OF MAKING TAP BUSHINGS
Filed June 30, 1933  2 Sheets-Sheet 2
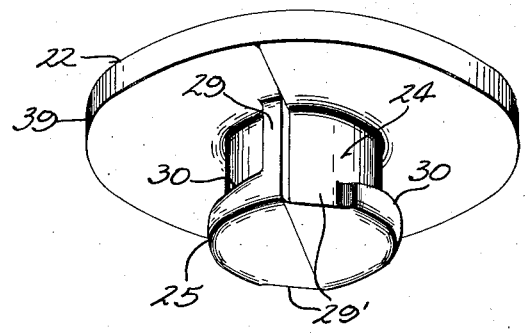
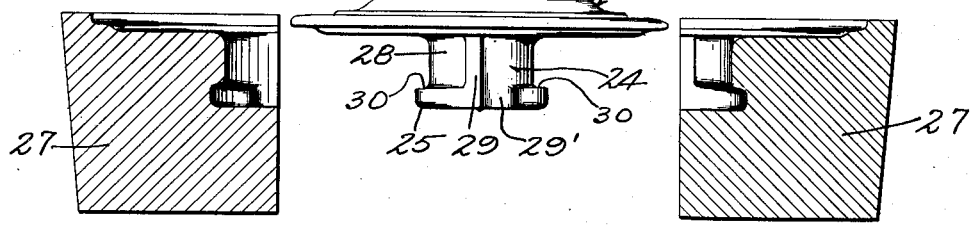
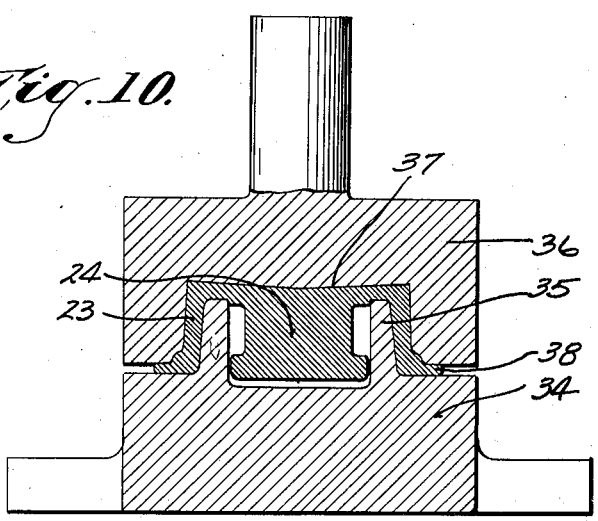
INVENTOR
Clifford C. Gladson
BY Wheeler, Wheeler & Wheeler
ATTORNEYS Patented Mar. 26, 1935

1,996,014

UNITED STATES PATENT OFFICE 1,996,014

PROCESS OF MAKING TAP BUSHINGS

Clifford C. Gladson, Milwaukee, Wis., assignor to Ladish Drop Forge Company, Cudahy, Wis., a corporation of Wisconsin Application June 30, 1933, Serial No. 678,459

2 Claims. (Cl. 29—148.2)

My invention relates to improvements in the process of forging tap bushings.

The object of my invention is to form a tap bushing, of small convention design, as a forging.

It is also the object of my invention to provide an improved forging process for producing a tap bushing or any forging wherein a central member of irregular contour is housed or cupped within a body member.

In the drawings:

Fig. 1 is a vertical section through a tap bushing installed in the head of a drum by means of a welding operation.

Fig. 2 is a side elevation of a piece of forgeable material such as may be used in my forging operation to produce the tap bushing shown in Fig. 1.

Fig. 3 is a side elevation of the product of the first forging operation performed upon the piece of metal shown in Fig. 2.

Fig. 4 is a side elevation of the product of the second forging operation in my process, a portion of the product being broken away to exhibit a vertical median section.

Fig. 5 is a side elevation of the product shown in Fig. 4 after a trimming operation, a portion being broken away to exhibit the precise point of trim.

Fig. 6 is a vertical section through a portion of the product after the fourth or drawing operation, the body of the tap bushing being shown in vertical section.

Fig. 7 is a side elevation of the tap bushing after the trimming operation performed on the product shown in Fig. 6 and constituting the final forging operation prior to the machining operation which completes the product.

Fig. 8 is a perspective of the product shown in Fig. 5.

Fig. 9 is a somewhat diagrammatic view showing the split die used in the second forging operation used to produce the product shown in Fig. 4.

Fig. 10 is a vertical section showing the product in the drawing operation between the upper and lower dies.

Like parts are designated by the same reference characters throughout the several views.

Tap bushings of the type shown in Fig. 1 have heretofore been constructed in somewhat the same configuration for installation in wooden beer barrels, however, such tap bushings have heretofore been case from gray iron or other metal suitable to the problem prevailing in the wooden beer barrel industry. Such tap bushings constructed of cast metal are, however, unsuited to the problems prevailing in the metal beer barrel industry wherein tap bushings are preferably secured to the barrel by means of a welding operation.

I therefore have solved the problem of providing a forged tap bushing 20 which includes a body portion 21 cupped in the shape indicated in Fig. 1 to provide a base flange 22 and a body flange 23 cupped around the thimble 24 provided with an irregular exterior configuration as shown most clearly in Fig. 8, the most important feature of which is a head 25 which has heretofore made the formation of tap bushings in a forging operation impossible since it has heretofore been considered that there was no method or process or apparatus for forging the thimble 24 with its head 25 within the cup of the body 21 of the tap bushing and still provide space for the removal of the forging die or dies used to shape the thimble.

I have solved the problem above stated by a series of forging, drawing and trimming operations which will now be described.

Using a conventional type of forgeable material, as shown in Fig. 2, I place the hot material upon an ordinary plate die provided with a depression to receive a slug 26 which is extruded from the body 21 to form the material out of which the thimble 24 is later to be shaped. This is accomplished in what will be hereinafter termed the first operation. Adjacent the plate die referred to, upon the bed of the same hammer used in the first operation, I provide a split die 27 shown in open position in Fig. 9, which is used in what I shall term the second operation which not only shapes the exterior configuration of the thimble 24, but also shapes the body 21 to produce the product shown in Fig. 4.

It is in this second operation that the irregular contour of the thimble 24 is shaped. This irregular contour includes a neck 28, a stop rib 29 and a head 25 slotted marginally at 29' and provided with cam surfaces 30. Complementary die surfaces for these various portions of the contour of the thimble 24 are found in the split die 27.

Likewise, as to the body 22, the split die provides means for shaping the material, as indicated most clearly at 31 in Fig. 4, whereby to provide sufficient material to form the completed product in the latter stages or operations of my process.

Excess stock in a fin 32 is then in the third operation, shown in Fig. 5, trimmed at 33 to prepare the work for a drawing operation, shown in Fig. 10, which produces the product shown in Fig. 6. In this operation a male die 34 with annular extension 35 maintains the proper spacing of the thimble and its head 25 with reference to the body flange 23 and the female die 36 shapes the exterior of the tap bushing to provide a satisfactory surface 37 for the inner surface of the bushing and the proper contour for the exterior of the body flange 23.

This operation which will be termed the fourth or drawing operation, leaves a fin 38 which is trimmed as indicated in Fig. 7, thus leaving a lip 39.

This completes the forging and trimming operations which place the tap bushing in condition for machining.

From the foregoing description of the product and process of forming a forged tap bushing, it will be seen that the irregular contour of the thimble 24 is accomplished in a separate preliminary forging process or series of operations and that the drawing operation, shown in Fig. 10, accomplished as a succeeding operation, houses the forged thimble in a cup such that the forging operation of the thimble could not possibly be accomplished with the body flange 23 in the position shown in Figs. 1, 6, 7, and 10.

I therefore provide a forged tap bushing not heretofore manufacturable by any of the processes known in the art.

I claim:

1. The process of forging a tap bushing including a preliminary forging operation in a split die to form a central headed thimble and a surrounding body flange, and a final drawing operation to cup the flange upwardly around the thimble and thimble head.

2. The process of forging a tap bushing including a preliminary hammer blow upon a billet over a solid die to form a body with a protuberance, a second blow operation comprising an extrusion of the protuberance into the irregular contour of a split die to form a headed thimble with a flanged body, a trimming operation, a drawing operation to cup the flange around the thimble and thimble head and a trimming operation to perfect the margins of the flange.

CLIFFORD C. GLADSON.